(12) United States Patent
Yawn

(10) Patent No.: US 7,264,729 B2
(45) Date of Patent: Sep. 4, 2007

(54) PROCESS FOR REDUCING CONTAMINANTS IN CONDENSATE RESULTING FROM THE CONVERSION OF BAUXITE TO ALUMINA

(75) Inventor: Emmett R. Yawn, Mandeville, LA (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/143,914

(22) Filed: Jun. 2, 2005

(65) Prior Publication Data

US 2006/0086671 A1    Apr. 27, 2006

Related U.S. Application Data

(63) Continuation-in-part of application No. 10/949,695, filed on Sep. 24, 2004, now abandoned.

(60) Provisional application No. 60/509,980, filed on Oct. 9, 2003.

(51) Int. Cl.
    *C02F 1/56*    (2006.01)
(52) U.S. Cl. ............... 210/639; 210/666; 210/708; 210/712; 210/718; 210/727; 210/730; 210/735; 423/121; 423/122

(58) Field of Classification Search ................ 210/727
    See application file for complete search history.

(56) References Cited

U.S. PATENT DOCUMENTS

| | | | | |
|---|---|---|---|---|
| 3,484,837 A * | 12/1969 | Bloomquist et al. | ........ | 210/728 |
| 3,664,951 A * | 5/1972 | Armstrong | .................. | 210/707 |
| 4,141,824 A * | 2/1979 | Smith | .......................... | 210/618 |
| 4,472,284 A * | 9/1984 | Bolhofner | .................... | 210/708 |
| 4,558,080 A * | 12/1985 | Quamme et al. | ............. | 524/72 |
| 4,681,683 A * | 7/1987 | Lindstol | ..................... | 210/521 |
| 4,734,216 A * | 3/1988 | Kelly et al. | .................. | 252/181 |
| 5,433,863 A * | 7/1995 | Braden et al. | ............. | 210/708 |
| 6,478,986 B1 * | 11/2002 | Lamb et al. | ................. | 252/180 |
| 6,527,959 B1 * | 3/2003 | Quadir et al. | ................ | 210/727 |
| 6,627,086 B2 * | 9/2003 | Mahoney et al. | ........... | 210/725 |
| 6,829,319 B2 * | 12/2004 | Ito et al. | ..................... | 376/313 |

* cited by examiner

*Primary Examiner*—Peter A. Hruskoci
(74) *Attorney, Agent, or Firm*—David L. Hedden

(57) ABSTRACT

This invention relates to a process for reducing the contaminants in condensate resulting from the conversion of bauxite to alumina.

9 Claims, 1 Drawing Sheet

PROCESS FOR REDUCING CONTAMINANTS IN CONDENSATE RESULTING FROM THE CONVERSION OF BAUXITE TO ALUMINA

CROSS REFERENCE TO RELATED APPLICATIONS AND CLAIM TO PRIORITY

This application claims priority to and is a continuation-in-part application of U.S. application Ser. No. 10/949,695, filed on Sep. 24, 2004, now abandoned the contents of which are hereby incorporated into this application, which claims priority to provisional application Ser. No. 60/509,980, filed on Oct. 9, 2003, the contents of which are hereby incorporated into this application.

TECHNICAL FIELD OF THE INVENTION

This invention relates to a process for reducing the contaminants in condensate resulting from the conversion of bauxite to alumina.

BACKGROUND OF THE INVENTION

There are many industrial process that use process water in carrying out reactions, as an effluent for removing unwanted by-products, as a diluent, and for many other functions. Examples of industrial processes, which use process water, include, for example, the refining of petroleum; the production of olefins, polymers, and organic acids; the production of metals, e.g. aluminum, iron, steel, and copper; and the benefaction of coal.

The process water often comes into contact with a variety of contaminants when the industrial process is carried out. These contaminants remain in the process water. Although there may be many contaminants in the process water and they vary depending upon the type of industrial process carried out, the more deleterious contaminants include suspended solids, oil and grease, metals, and silicate compounds.

The process water is often subject to elevated temperatures. It may be converted to steam, which often undergoes condensation. The condensate may also contain the contaminants that are present in the process water.

Although there are many methods known for removing contaminants from aqueous systems, these methods cannot be successfully used to remove contaminants from process water and condensates, particularly without reducing the heat capacity of the process water and/or condensate. The temperature of the condensate typically ranges from about 80° C. to 100° C., most typically from 95° C. to 100° C. What makes it difficult to purify the condensate is the presence of suspended solids, which can be 1000 times as high as that found in other contaminated aqueous systems. Because the temperature is elevated, it is difficult to purify condensate, particularly without reducing the heat capacity of the condensate. Additionally, the difficulty is compounded because the condensate may have high alkalinity, which increases the stability of the emulsion of oil found in the process water and/or condensate.

The elevated temperature and high alkalinity of the condensate also impairs the usefulness of chemicals typically used to break the emulsion, and/or coagulate suspended solids. Thus, many processes that could be used to purify condensate are not compatible with the high temperatures and alkalinity.

The temperature of condensate typically ranges between 80° C. and 100° C. If the purification can be carried out without any reduction in the heat capacity of the condensate, a great deal of energy can be conserved. The water does not have to be reheated for use in the process or as boiler feedwater.

One example of process water and/or condensate, which has the potential for reuse, is that generated by the production of alumina from bauxite ore. The majority of aluminum produced today is manufactured from bauxite ore. One of the primary means for converting bauxite ore to alumina is by the Bayer process as shown in FIG. 1. The alumina is then converted to aluminum, which is produced commercially by the electrolytic smelting of alumina.

The Bayer process for purification of bauxite ore into alumina involves the high temperature digestion of the bauxite ore in a solution of sodium hydroxide (caustic). The digestion typically takes place at 100 to 300 psi. The effluent from the digestion is flashed, i.e. reduced in pressure, in eleven stages to atmospheric pressure. Each step produces steam as the pressure drops. This steam is fed into a heater coil in the next immediate downstream vessel to condense the steam into process water and/or condensate. This condensate is often waste because contains small amounts of aluminum, iron, silica, caustic, and organics. The contamination is caused by carryover of effluent liquor into the flashed steam. The contamination contains both soluble and insoluble material. The insoluble material is referred to as "red mud".

Both the red mud and the dissolved material are present in the process water and/or condensate at varying amounts depending upon various operating conditions. Often an antifoam is used to keep high froth levels from increasing carryover. The antifoam may contribute to the organic contamination in the condensate. The typical alumina plant will produce thousands of gallons per minute of this condensate. It is often wasted, but could be used for boiler make up water if the purity were improved. This could result in millions of dollars saved each year at each plant site.

For purposes of describing this invention, condensate is condensate that results from the condensation of steam generated from any stage of the process whereby bauxite is converted to alumina, particularly the Bayer process. There are three major sources of condensate in an alumina facility. There is the digestion condensate that is the most contaminated, the evaporator condensate which is somewhat contaminated, and the clean condensate from surface condensers and the like (closed systems with no process contact). The condensate carries impurities such as mineral oil, silica, iron oxide, aluminum and other suspended solids from the ore. Because condensate usually contains some of the caustic from the digestion process, the oil can be strongly emulsified and the aluminum dissolved. The pH of the condensate can vary over wide ranges, but it highly alkaline. The pH is typically 10.0 to 11.0.

Because the temperature of the condensate is typically from about 95°-100° C., it has the potential to be used as a boiler feedwater if the impurities could be removed. However, if utilized without treatment, the boilers would exhibit frequent failures, which would result because of the precipitation of impurities. Because there is no effective and economical way of removing the impurities from the condensate, the condensate is frequently wasted.

All citations referred to in this application are expressly incorporated by reference.

BRIEF SUMMARY OF THE INVENTION

Figure 1:
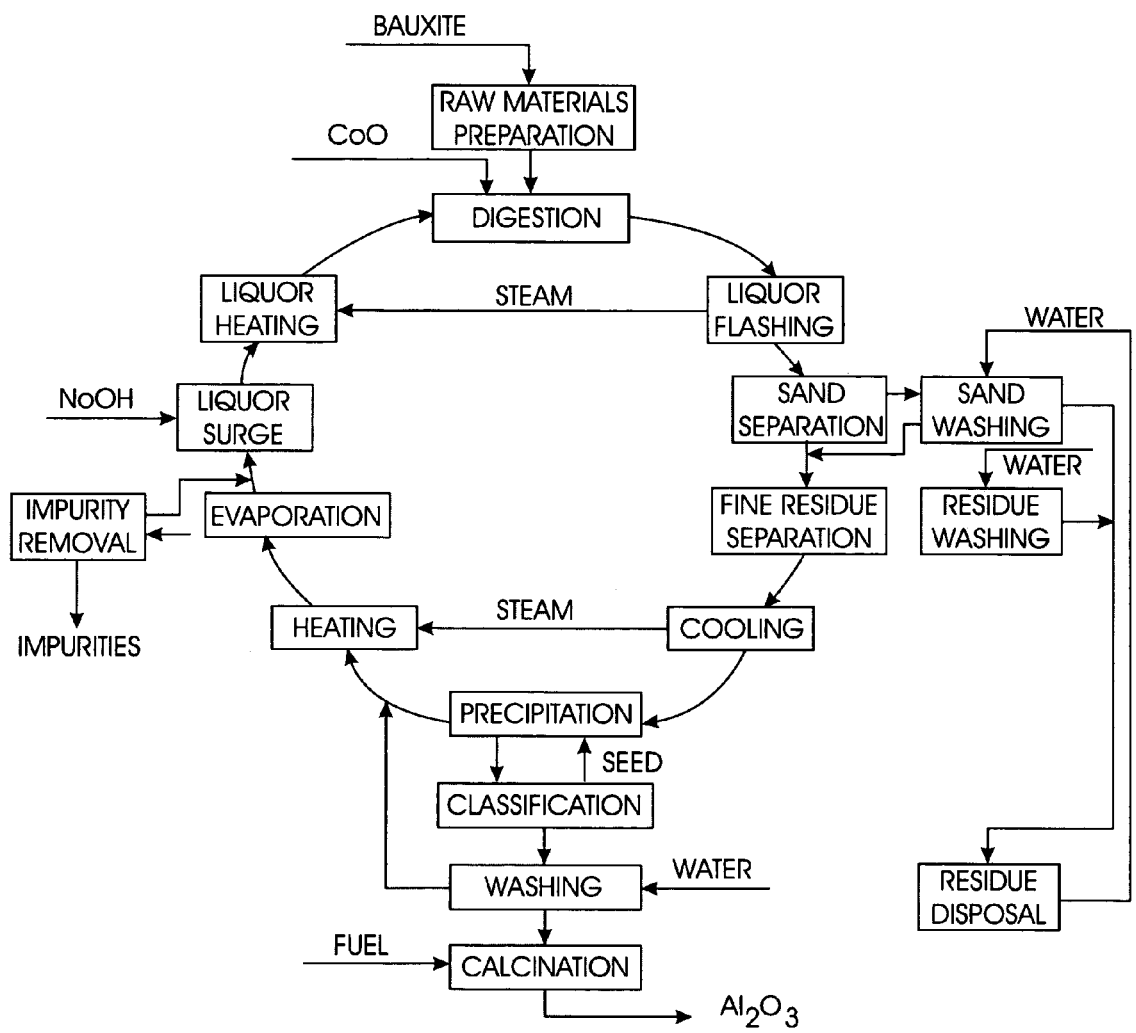
FIG. 1 is a diagram, which illustrates how the Bayer process is typically carried out. The Bayer process is used to convert bauxite ore to alumina and identifies condensate streams used in the process. The process generates condensate containing contaminants.

This invention relates to a process for reducing contaminants in condensate, which comprises:
(a) adding from 1 ppm to 1,000 ppm, preferably from 5 ppm to 200 ppm, and most preferably from 10 to 100 ppm of a first coagulant having a mean diameter of from 1 micron to about 25 microns, preferably from about 5 microns to about 15 microns to the condensate to be purified;
(b) then adding from 1 ppm to 1,000 ppm, preferably from 5 ppm to 200 ppm, and most preferably from 10 to 100 ppm of a second coagulant having a mean diameter of from 40 microns to about 200 microns, preferably from about 50 microns to about 100 microns;
(c) filtering said condensate.

In some cases, particularly when the condensate is contaminated with large amounts of suspended solids, it may be useful to clarify the condensate after coagulation and before filtering. Clarifying the condensate before filtering enables one to carry out the process more effectively when the condensate contains higher concentrations of solids. Thus, the process can be used more effectively in different industrial settings.

Preferably, the condensate is further purified after filtration so that it can be used as boiler feed water. Methods used to further purify the process water include demineralization with ion exchange, reverse osmosis, evaporation, partial demineralization, degassification, and mixed bed demineralization.

The process is particularly useful for removing impurities from condensate, which is generated by the production of alumina from bauxite ore. After the condensate has been purified, it can then be recycled through the process used to convert bauxite to alumina, or if clean enough, it can be used as boiler feedwater.

The process is particularly useful, because impurities can be removed from the condensate without any substantial reduction in the heat capacity of the condensate. The heat capacity in some cases exceeds one million BTU's per 1,000 gallons of condensate.

The process can be carried out on-line with negligible heat loss. The time it takes for the contaminated water to enter the treatment and leave the treatment process is approximately 30 to 90 seconds. It is because of this rapid treatment time that the temperature of the condensate can be maintained before it is re-used.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed.

The function of the first coagulant is to break any oil-water emulsion (oil includes grease) existing in the process water and/or condensate to be treated. The first coagulant separates the oil and the process water and/or condensate, so the oil can be coagulated with the solids in the next step of the process. The pH of the condensate at this stage of the process is typically between 8.5 and 10.0.

The first coagulant has a colloid structure, preferably symmetrical, and has a mean diameter of from about 1 micron to about 25 microns, preferably from about 5 microns to about 15 microns. Examples of the coagulants that can be used as the first coagulant include cationic electrolytes with a low molecular weight. Most preferably used as the first coagulant are melamine formaldehyde cationic coagulants, particularly those having a melamine to formaldehyde ratio of about 1:1 to about 1:10, preferably from about 1:2 to about 2:8.

The function of the second coagulant is to agglomerate the oil and suspended solids in the process water and/or condensate, so that the suspended solids can be effectively removed from the process water and/or condensate by filtration. The pH of the condensate at this stage of the process is also typically between 8.5 and 10.0.

The second coagulant has a colloid structure, preferably asymmetrical, and has a mean diameter of from about 40 microns to about 200 microns, preferably from about 50 microns to about 100 microns. Methods of preparing such coagulants are described in U.S. Pat. No. 4,558,080; 4,734,216; and 4,781,839. Preferably, the tannin-based coagulant is prepared with condensed polyphenolic tannins under slightly acidic conditions, where the pH is less than 7, and where the molar ratio of the primary amine from the amino compound to the tannin repeating unit is from about 1.5:1 to about 3.0:1.

The second coagulant is added within minutes, typically within 60 seconds after the first coagulant is added to the process water and/or condensate to be treated. Typically, it is added close to the inlet of the filter, and it is used to pre-coat the filter media.

As was mentioned previously, it may be useful to clarify the condensate after coagulation and before filtering when the solids content is high. Although any means know in the art can be used to clarify the condensate, one method that has been shown to be particularly effective, is to pass the condensate through settling device, preferably a separator, e.g. a Lamella® gravity settler/thickener, which is sold by Parkson Corporation. The separator reduces the suspended solids in a liquid stream. Typically, the separator is used if the incoming suspended solids is higher than the filter, e.g. the Dyna-Sand filter, can handle effectively, e.g. typically if the turbidity is greater than 120 NTU.

Settling may be accomplished by a variety means. Traditionally, settling was accomplished by placing the liquid containing the suspended solids in a quiescent pond such as a sedimentary basin that may be several acres, where the solids were allowed to settle. A more modern approach is to pass the liquid through a clarifier where the particle size is increased by using a polymer to increase the settling rate. The material settles faster in a clarifier than it does in a pond, because of the increased size of the suspended solids and increased density of the particulate material suspended in the fluid.

The conventional clarifier is usually a large tank so the fluid velocity may be reduced to less than one or two feet per minute. The configuration may vary from a long rectangular basin that is fed from one end to a circular design fed in the middle. All use the same principal of settling the solids through the clear fluid to the bottom of the vessel. Because the depth is several feet, this may take a long time. This is why the vessels are so large.

Recent technology involves mechanical separation augmented by the use of a polymer to change the physical character of the suspended particles to be separated. This process uses a series of parallel plates set at an angle from horizontal (e.g. 45 to 60 degrees) that collect the particles from the fluid that passes through them in parallel. The plates span the entire unit of the clarifier. The solids then settle only several inches onto each of the plates. The clear water passes upwards and overflows where it is channeled for end use, while the solids accumulate on the plates. Large systems may use twenty or so parallel plates, while smaller system may require only eight or ten plates.

Although a variety of filters are useful for carrying out the filtration step of the process, the preferred filter is a fluidized bed filter, particularly an upflow sand filter. This filter utilizes a fluidized bed where the media in the fluidized bed develops a negative charge. This allows the cationic coagulants to pre-coat the filter, which causes the contaminants to stick to the media. This enables one to use less coagulant and the coagulant is removed from the stream, preventing it from becoming an impurity in the filtered fluid.

Particularly useful, as the filter, is the DynaSand® filter supplied by Parkson Corporation. This filter is a continuous-backwash, upflow, deep-bed, granular-media filter. Recycling the sand internally through an airlift pipe and sand washer continuously cleans the filter media. The cleansed sand is redistributed on top of the sand bed, allowing for continuous flow of filtration and rejected water. Other features of the filter include a continuously cleaned sand bed, no moving parts, low pressure drop, high solids capability, and a top-feed design.

Preferably, after coagulation, and possibly clarification, and filtering, the turbidity of the condensate is 1.0 NTU or less. After the suspended solids are removed from the condensate, there still may still dissolved materials such as sodium hydroxide, aluminum, and smaller amounts of iron, calcium, silica, organics, etc. remaining in the condensate. Preferably, these materials need to be removed from the process water and/or condensate, so the condensate can be used as boiler feed water. Any number of processes may be added downstream from the filter to complete this purification process, e.g. demineralization with ion exchange (cation or anion), reverse osmosis, evaporation, partial demineralization, decarbonation, degassification, and/or mixed bed demineralization. Any proven technique for removing ionic contaminants from water streams should be effective as a second stage in this condensate recovery process.

The treatment time from entering the filter to exiting the ion exchange unit varies depending upon the degree of contamination and flow rate, but typically takes less than 20 minutes, more typically from about 5 to about 15 minutes.

As was pointed out previously, the subject process is particularly useful for treating process condensate generated by the Bayer process used to produce alumina from bauxite. In the Bayer process, condensate is generated as follows:

(1) The flash steam that is produced from pressure reduction of the digester effluent is used to heat the feed to the digester. The flash steam is ultimately condensed and is the largest source of condensate that is produced.

(2) Further downstream in the process, solids are removed for disposal and the clear supernate (containing caustic and dissolved alumina) is precipitated in a series of multiple effect evaporators. These evaporators produce the second largest stream of condensate.

Note that both these streams are generated by the process rather than from condensed steam from the powerhouse. This is why they are so contaminated.

Other sources of condensate are the condensed steam from the surface condensers and steam heated process vessels.

After the contaminated condensate is treated, it can be piped (the motive pressure of the steam may be sufficient to transport it) or pumped, if necessary, to the boiler feedwater unit, recycled in the process, or sent to a holding tank where is stored until it is ready to be used.

Abbreviationsand/or Definitions

MFC a melamine formaldehyde cationic coagulant having melamine to formaldehyde mole ratio 2:8 having a mean volume average of from about 10 microns.

TAC tannin amine coagulant having, supplied by ECO-LAB under the tradename WCS 4110, having a having a mean volume average of from about 50 to 100 microns.

FILTER a fluidized bed sand filter supplied by Parkson Corporation under the trademark DynaSand® sand filter.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

EXAMPLE

Removal of Contaminants from Condensate Generated by the Bayer Process for Producing Alumina This example illustrates how the process is used to remove contaminants from the digester process water (DPW) and the evaporator process condensate (EPC), generated by the Bayer process for producing alumina. The alumina was produced from bauxite by the Bayer process as shown FIG. 1. The temperature of the DPW was from about 80° C. to about 100° C. and the temperature of the EPC was from about 80° C. to about 100° C. The flow rate for the condensate tested was approximately 60 GPM and tests were conducted for about a month. The sample was piped from the process and the purification took place done on-line.

Twenty ppm of MFC were added to samples of the DPW and the EPC. Ten seconds later, 15 ppm of TAC were added to the DPW and the EPC, which had been treated with the melamine formaldehyde emulsion breaker. The condensate was then filtered using FILTER.

The contaminants (CNT) in the condensate, and their amounts before (DPWB and EPWB) and after treatment (DPWA and EPWA) are set forth in Table I for the two different streams, the digester stream and evaporator stream, along with the change (CH) and percent change (% CH). The most important contaminants in this process are total suspended solids (TSS), oil and grease (O&G), iron (FE), and barium (BA).

There was no significant loss of heat from the contaminated process water during the treatment process, and the time it took for the contaminated water to enter the treatment and leave the treatment process was approximately one minute.

TABLE I (Impurities before and after treatment)

| CNT | UNITS | DPWB | DPWA | CH | % CH | EPWB | EPWA | CH | % CH |
|-----|-------|------|------|------|-------|------|------|------|-------|
| TSS | mg/l  | 6.4  | 0    | 6.4  | 100   | 2.7  | 0    | 2.7  | 100   |
| O&G | mg/l  | 69.1 | 3.3  | 65.8 | 95.2  | 4.7  | 2.2  | 2.5  | 53.19 |
| FE  | Ppm   | 2.7  | 0.05 | 2.65 | 98.15 | 0.10 | 0    | 0.10 | 100   |
| BA  | Ppm   | 0.7  | 0.07 | 0.63 | 90.0  | 0.30 | 0    | 0.30 | 100   |

The results in Table I clearly demonstrate the effectiveness of the treatment process. The amounts of several different contaminants were substantially reduced or removed when the process condensate was treated according to the process. The purified water can then be used as boiler feedwater or recycled as process water.

I claim:

1. A process for reducing contaminants in contaminated condensate resulting from the refining of aluminum, which comprises:
    (a) adding from 1 ppm to 1,000 ppm of a cationic melamine formaldehyde coagulant having a having a mean diameter of from about 1 micron to about 25 microns to the condensate to be treated;
    (b) then adding from 1 ppm to 1,000 ppm of a cationic mannich-tannin coagulant having a mean diameter of from about 40 microns to about 200 microns;
    (c) filtering said condensate with a continuous-backwash, fluidized bed upflow filter
wherein the media of the fluidized bed develops a negative charge, and the temperature of the treated condensate is from 80° C. to 100° C., to reduce said contaminants in said condensate.

2. The process of claim 1 wherein the condensate is generated in production of alumina from bauxite ore.

3. The process of claim 2 wherein the production alumina from bauxite ore is the Bayer process.

4. The process of claim 3 wherein the condensate is selected from the group consisting of digestion condensate, evaporator condensate, and clean condensate from surface condensers.

5. The process of claim 4 wherein the condensate is clean condensate from surface condensers.

6. The process of claim 5 wherein the condensate is recycled in the Bayer process for converting bauxite ore to alumina.

7. The process of claim 6 wherein the condensate is further purified by demineralization with ion exchange, reverse osmosis, evaporation, partial demineralization, decarbonation, degassification, and/or mixed bed demineralization.

8. The process of claim 7 wherein the condensate is clarified after coagulation and prior to filtering.

9. The process of claim 1, 2, 3, 4, 5, 6, 7, or 8 wherein the condensate is clarified by passing the condensate through a lamella separator.

* * * * *